United States Patent
Merino Lopez et al.

(10) Patent No.: US 10,940,614 B2
(45) Date of Patent: Mar. 9, 2021

(54) METHOD FOR PRODUCING RUBBER CRUMB, AND RUBBER CRUMB

(71) Applicants: COMPAGNIE GENERALE DES ETABLISSEMENTS MICHELIN, Clermont-Ferrand (FR); ASSOCIATION POUR LA RECHERCHE ET LE DEVELOPPEMENT DES METHODES ET PROCESSUS INDUSTRIELS (ARMINES), Paris (FR)

(72) Inventors: Jose Merino Lopez, Clermont-Ferrand (FR); Frédéric Pialot, Clermont-Ferrand (FR); Nathalie Coste, Clermont-Ferrand (FR); Jean-Jacques Letourneau, Gragnague (FR); Jacques Fages, Albi (FR); Martial Sauceau, Saint-Juery (FR)

(73) Assignees: COMPAGNIE GENERALE DES ETABLISSEMENTS MICHELIN, Clermont-Ferrand (FR); ARMINES, Paris (FR)

( * ) Notice: Subject to any disclaimer, the term of this patent is extended or adjusted under 35 U.S.C. 154(b) by 281 days.

(21) Appl. No.: 16/060,678

(22) PCT Filed: Dec. 7, 2016

(86) PCT No.: PCT/EP2016/080148
§ 371 (c)(1),
(2) Date: Jun. 8, 2018

(87) PCT Pub. No.: WO2017/097859
PCT Pub. Date: Jun. 15, 2017

(65) Prior Publication Data
US 2018/0361627 A1    Dec. 20, 2018

(30) Foreign Application Priority Data

Dec. 9, 2015    (FR) .................................... 1562084

(51) Int. Cl.
*B29B 17/04*    (2006.01)
*B01J 3/00*     (2006.01)
(Continued)

(52) U.S. Cl.
CPC ............ *B29B 17/0404* (2013.01); *B01J 3/008* (2013.01); *B29B 7/16* (2013.01); *B29B 7/40* (2013.01);
(Continued)

(58) Field of Classification Search
CPC ...... B01J 3/008; B29B 17/02; B29B 17/0404; B29B 2009/125; B29B 2017/0428;
(Continued)

(56) References Cited

U.S. PATENT DOCUMENTS

| 3,319,895 A | 5/1967 | Williams et al. |
| 6,426,136 B1 | 7/2002 | Rouse et al. |

(Continued)

FOREIGN PATENT DOCUMENTS

| DE | 25 41 771 A1 | 4/1976 |
| DE | 195 43 914 C1 | 1/1997 |

(Continued)

*Primary Examiner* — Frances Tischler
(74) *Attorney, Agent, or Firm* — Venable LLP

(57) ABSTRACT

A process for manufacturing rubber crumb comprises the following steps: (a) suspending rubber granules having a given size in an autoclave (1) containing a supercritical fluid; (b) agitating the mixture for a predetermined time at constant pressure and constant temperature; (c) carrying out an isenthalpic expansion of the mixture from step (b) by spraying it through a nozzle (20).

17 Claims, 2 Drawing Sheets

Figure 1:
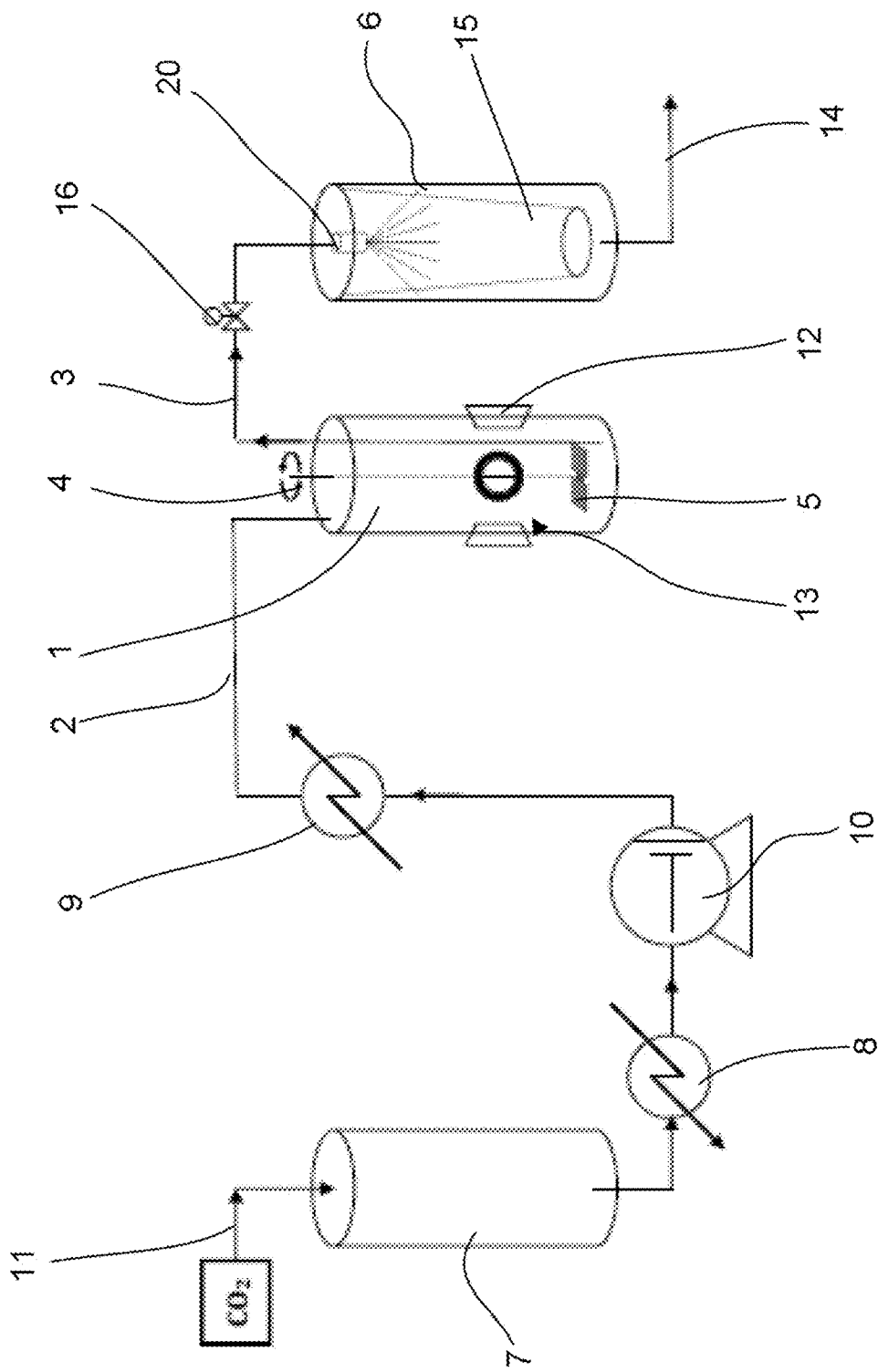

(51) Int. Cl.
  *B29B 7/94* (2006.01)
  *B29B 7/74* (2006.01)
  *B29B 7/40* (2006.01)
  *B29B 7/16* (2006.01)
  *B29B 9/12* (2006.01)
  *B29B 17/02* (2006.01)
  *B29K 21/00* (2006.01)
  *B29L 30/00* (2006.01)

(52) U.S. Cl.
  CPC .............. *B29B 7/7495* (2013.01); *B29B 7/94* (2013.01); *B29B 9/12* (2013.01); *B29B 17/02* (2013.01); *B29B 2009/125* (2013.01); *B29B 2017/0428* (2013.01); *B29K 2021/00* (2013.01); *B29L 2030/00* (2013.01); *Y02P 20/54* (2015.11); *Y02W 30/62* (2015.05)

(58) Field of Classification Search
  CPC ........... B29B 7/16; B29B 7/40; B29B 7/7495; B29B 7/94; B29B 9/12; B29K 2021/00; B29L 2030/00; Y02P 20/544; Y02W 30/625
  See application file for complete search history.

(56) References Cited

U.S. PATENT DOCUMENTS

| | | | |
|---|---|---|---|
| 6,680,110 | B1 | 1/2004 | Deeb et al. |
| 2004/0079459 | A1* | 4/2004 | Veas ..................... B29D 30/54 152/209.6 |
| 2006/0141110 | A1 | 6/2006 | Fages et al. |

FOREIGN PATENT DOCUMENTS

| | | |
|---|---|---|
| EP | 1 569 522 A1 | 9/2005 |
| EP | 2471642 A1 | 7/2012 |
| WO | 2005/049656 A2 | 6/2005 |

* cited by examiner

METHOD FOR PRODUCING RUBBER CRUMB, AND RUBBER CRUMB

FIELD OF THE INVENTION

The invention relates to the manufacture of rubber crumb from used rubber materials and to the use thereof in the manufacture of tyres.

RELATED ART

The recycling of end-of-life rubber materials, more particularly that of used tyres, is a major industrial issue. The recycling of used tyres is currently mainly for energy purposes, but the reuse of vulcanized rubber may lead to significant material savings. The material thus reused is in the form of rubber crumb.

Rubber crumbs are granules, preferably microparticles having dimensions of less than 1 mm. They are generally obtained by grinding used tyres and are typically used as filling material in rubber compositions, especially for tyres.

Various processes for obtaining rubber crumb from shredded used tyres are known.

Among these processes mention is made of cryogenic grinding, as described in document WO-2005/049656. Thus, after having removed the metal and the fibres, the fragments of tyres or cooled using liquid nitrogen in order to take them below the glass transition temperature of the rubber before being finely ground. Besides the many separating and grinding steps, such a process requires a large amount of liquid nitrogen to treat the rubber and therefore proves to be expensive and energy-consuming.

Another example of grinding fragments of rubber is described in EP-2 471 642 in which rubber particles are micronized by making them pass between two rotating frustoconical discs, where one of the discs is, in addition, oscillating. However, this process provides quite coarse particles, the particles obtained having a mean value of their dimensions of around 425 µm, for a quite low energy efficiency thereof.

Now, it has been observed that the properties of the rubber compositions using a filling crumb are improved with the reduction in the size of these particles. Furthermore, the amount of filling crumb that may be added to the base compound, without impairing the properties thereof, increases with the reduction in the size of these particles. Thus, in order to reduce the cost of materials that form a tyre, and consequently the price of the tyre, it is necessary to obtain rubber crumb particles of very small size in a large amount.

With this objective, document U.S. Pat. No. 6,680,110 proposes the use of supercritical carbon dioxide which is able to penetrate inside the rubber particles, in particular by adding additives thereto, such as surfactants to promote the soaking. The carbon dioxide in the supercritical state is bought into contact with the rubber particles for the time needed for the swelling of the particles at high pressure and then the pressure is rapidly dropped in order to cause these particles to explode. Thus, crumb particles of smaller dimensions are obtained, the mean dimension thereof being around 180 µm, but, besides the soaking time which is quite long, this process also uses additives.

The objective of the invention is to overcome at least one of the drawbacks of the processes for obtaining rubber crumb that have just been described and to propose a process that makes it possible to obtain a crumb having an even finer particle size.

SUMMARY OF THE INVENTION

For this purpose, the invention proposes a process for manufacturing rubber crumb comprising the following steps:
a) suspending rubber granules having a given size in an autoclave containing a fluid in the supercritical state under pressure;
b) agitating the mixture for a predetermined time;
c) carrying out an isenthalpic expansion of the mixture from step b) by spraying it through a nozzle.

Rubber crumbs are generally obtained from grinding used tyres. They are generally in the form of granules, the size of which is several hundreds of micrometres. They comprise all the constituents that go into a formulation of a tyre composition, such as for example elastomers, in particular diene elastomers, reinforcing fillers, non-reinforcing fillers, plasticizers, vulcanization additives, protective agents. Rubber crumbs also comprise the products formed by the reactions that these constituents undergo during the various steps for manufacturing the composition of the tyre, in particular during the vulcanization step, and during the life of the tyre.

The rubber crumbs within the meaning of the present invention are granules. The rubber crumb consists of a crosslinked rubber composition based on an elastomer and a filler.

A fluid, the temperature of which is raised above its critical temperature and the pressure of which is above that of its critical pressure is referred to hereinbelow as a supercritical fluid. A supercritical fluid has a behaviour and properties that are intermediate between the gas state and the fluid state, it is therefore dense and compressible. Consequently, it has several advantages: it has quite a good solvent power that can be regulated by adjusting the pressure and/or temperature parameters of the fluid, and it forms a good particle transport agent.

According to the invention, the mixture is agitated for a predetermined time at constant pressure and constant temperature in order to reach the thermodynamic equilibrium of the mixture inside the autoclave. Next, a sudden expansion of the mixture is carried out by making it pass through a spray nozzle. Sudden is understood to mean an expansion where the mixture passing through the nozzle reaches a velocity of the order of 100 metres per second and in all cases greater than 10 metres per second. It is the pressure difference between upstream and downstream of the nozzle that causes this expansion. Furthermore, as this nozzle is thermally insulated to prevent any heat exchange of the mixture with the outside, the expansion is isenthalpic. This expansion gives rise to a drop in temperature of the fluid via the Joule-Thomson effect and therefore a drop in temperature of the conveyed particles that pass through the nozzle. The temperature of the particles drops below the glass transition temperature (Tg) of the rubber.

The glass transition temperature Tg of the rubber, where rubber is understood to mean an elastomeric compound comprising an elastomer polymer and at least one filler, is a standard and intrinsic physical characteristic of the material. The glass transition temperature is the temperature at which the elastomeric compound changes from a deformable rubbery state to a rigid glass state. The glass transition temperature Tg of an elastomeric compound is generally determined during the measurement of the dynamic properties of the elastomeric compound on a viscosity analyser (Metravib VA4000), according to the standard ASTM D 5992-96. The measurement of the dynamic properties is carried out on a sample of elastomeric compound that is vulcanized, i.e. cured, to a degree of conversion of at least 90%, the sample having the shape of a cylindrical test specimen having a thickness equal to 2 mm and a cross section equal to 78.5 mm². The response of the sample of elastomeric compound to a simple alternating sinusoidal shear stress, having a peak-to-peak amplitude equal to 0.7 MPa and a frequency equal to 10 Hz, is recorded. A temperature sweep is carried out at a constant temperature rise rate of +1.5° C./min. The results utilized are generally the complex dynamic shear modulus G*, comprising an elastic component G' and a viscous component G", the dynamic loss tgδ, equal to the ratio G'/G" and the viscous component of the shear modulus G". The glass transition temperature Tg is the temperature at which the viscous component of the shear modulus G" reaches a maximum during the temperature sweep.

The glass transition temperature of the crosslinked elastomeric compounds used in the manufacture of the tyres is between −75° C. and −5° C. at 10 Hz. Thus, the particles of crosslinked rubber, the temperature of which when passing through the spray nozzle is substantially equal to the glass transition temperature, stretch and break easily during passage through the nozzle, meaning that their size is then reduced. Moreover, during the spraying, the particles are stressed at high frequency which produces a dynamic stiffening of the particles. Indeed, it has been established that in the case of routine tests, the effect of the stress frequency on the viscoelastic quantities of a polymer or blends of polymers is inverse to that of the temperature, which is known as the time-temperature equivalence principle. The William Landel Ferry empirical relation (WLF law) associated with the time-temperature equivalence principle makes it possible to summarize the variations of the maximum viscosity of the polymers for temperatures close to the glass transition temperature Tg. Therefore, an increase in the stress frequency of the rubber particles has the same effect on their behaviour as a drop in their temperature. Thus, passing through the spray nozzle is equivalent to a drop in temperature to around −100° C. (a drop of around 30° C. being due to the temperature equivalent effect linked to WLF), which makes their behaviour very brittle and enables the fragmentation thereof during passage through the spray nozzle.

In one embodiment of the invention, the process comprises, after step c), a step d) in which the rubber crumb particles are separated from the supercritical fluid. In this embodiment, the supercritical fluid is in the form of ice in step c) and an additional step of separating the two solids is carried out.

Advantageously, the granules from step a) have a size equal to or less than 2 mm.

Preferably, the expansion takes place in a collection container that is at atmospheric pressure.

Advantageously, step c) takes place in a collection container provided with a filter bag. This makes it possible to collect the ground crumb and to separate it from the carbon dioxide.

Preferably, said supercritical fluid is carbon dioxide.

Use could be made, as supercritical fluid, of: molecular nitrogen, or carbon dioxide. The latter is preferred since it is easy to obtain, cheaply, its critical temperature being 31.1° C. and its critical pressure being 7.4 MPa. Furthermore, it is nonflammable, non-toxic, it is relatively inexpensive and readily lends itself to recovery and recycling.

Advantageously, the rubber granules are mixed with the supercritical fluid in order to give a mixture having a crumb content ranging up to 50% by volume.

Preferably, during step b) the pressure is between 10 MPa and 30 MPa, and greater than the critical pressure of the fluid. In a preferred exemplary embodiment of the invention, the pressure in step c) is around 14 MPa and the temperature is around 50° C.

Advantageously, during step c) the pressure in the autoclave is maintained between 10 and 20 MPa in order to maintain a sudden expansion of the mixture.

Preferably, the supercritical fluid leaving the collection container is reused in order to manufacture rubber crumb. The fluid is recovered, it is expanded, purified and cooled in order to pass into the liquid state, then it is pumped and compressed in order to be brought to the supercritical state then reinjected into the autoclave, in order to obtain an even more economical process.

Advantageously, crumb obtained in step c) is used instead of the granules of step a). The treatment is then applied to the fine crumb in order to reduce the size thereof even more.

The objective of the invention is also achieved with rubber crumb particles obtained with the process of the invention which have dimensions of less than 30 μm.

The particles obtained with the process of the invention are used in a rubber composition for tyres.

BRIEF DESCRIPTION OF THE FIGURES

Other features and advantages of the invention will become apparent in the following description. This description, given by way of example and non-limitingly, refers to the appended drawings, in which:

FIG. 1 represents a piping and instrumentation diagram of a facility for implementing the process of the invention;

FIG. 2 illustrates the phase diagram of the carbon dioxide used with the process of the invention;

FIG. 3 illustrates a diagram of the number distribution of the size of the particles obtained with the process of the invention.

DETAILED DESCRIPTION OF THE INVENTION

The diagram from FIG. 1 schematically illustrates a facility for implementing the process of the invention. The supercritical fluid used is carbon dioxide.

The carbon dioxide in the liquid state arrives through a duct 11 originating from a tank where it is in the liquid-vapour equilibrium state, is stored in a tank 7 at a pressure of around 5 MPa. It is circulated within the facility by a pump 10. By way of example, the pump 10 is of diaphragm type and is capable of providing a maximum flow rate of around 35 kg/h. The carbon dioxide originating from the tank 7 passes through a condenser 8 before being sucked up by the pump 10. The condenser 8 makes it possible to subcool the liquid before it arrives at the pump 10 to prevent any appearance of gas in the pump 10. The carbon dioxide is compressed to a pressure of around 10 MPa and lower than 35 MPa, and then passes into a heat exchanger 9 which raises its temperature to around 315 K and above the critical temperature of the fluid. On leaving the exchanger 9 the fluid is supercritical.

A mixing autoclave 1 receives a predetermined amount of rubber granules. The rubber granules introduced into the autoclave 1 were obtained by a prior grinding and have a size D50 (by number) of between 20 and 200 μm. The autoclave is provided for this purpose with an opening that is sealed in a leaktight manner by a cover (not visible in the drawings). Portholes 12 which make it possible to view the inside of the autoclave. An inlet duct 2 in the tank makes it possible to introduce the fluid in the supercritical state therein. The rubber granules are mixed with the supercritical fluid in order to give a mixture having a powder content ranging up to 50% by volume.

An outlet duct 3 enables the mixture formed by the rubber granules 13 (the presence of which is indicated by an arrow in FIG. 1) and the supercritical fluid to exit in the direction of a valve 16 connecting it to a collection tank 6. A stirrer 4 with mixing blades 5 is provided inside the mixing autoclave 1 and makes it possible to make the dispersion of the rubber granules in the fluid uniform. The stirrer 4 is preferably of magnetic type and drives the blades of the stirrer in the direction of the arrows in the diagram from FIG. 1. The autoclave 1 is provided with sapphire windows 12 through which it is possible to observe the state of the mixture.

When the valve 16 installed at the outlet of the autoclave is open, the mixture of supercritical fluid and of crumb granules which leaves through the duct 3 is sprayed using a nozzle 20 into a crumb tank 6. The nozzle 20 is thermally insulated in order to prevent any heat exchange with the external environment. The crumb obtained is collected inside a porous bag 15 made from PTFE fibres. The fluid, carbon dioxide in this case, leaves the tank 6 through an outlet duct 14 and it is released into the atmosphere. In one variant of the invention, the outgoing carbon dioxide is recycled by capturing it at the outlet in order to expand it, purify it and cool it in order to pass into the liquid state, then it is reintroduced into the facility of the invention.

The process for obtaining rubber crumb particles with the facility of the invention will be explained in what follows.

Rubber granules having a mean diameter equal to or less than 200 μm are introduced into the mixing autoclave 1. The valve 16 is closed. Next, carbon dioxide in the supercritical state is injected into the autoclave 1 to a pressure value of around 21 MPa. The stirrer 4 is then switched on at a speed of around 500 rpm for a duration of around 10 min under pre-established and constant pressure and temperature conditions. This makes it possible to ensure that the rubber granules are properly dispersed in the supercritical fluid and also that the carbon dioxide and the rubber granules have interacted, the supercritical fluid acting at this stage as a solvent for removing the impurities (such as oils) located on the surface of the rubber granules. The temperature conditions inside the autoclave, and also the stirring speed and duration conditions are managed by a control unit (not represented).

Figure 2:
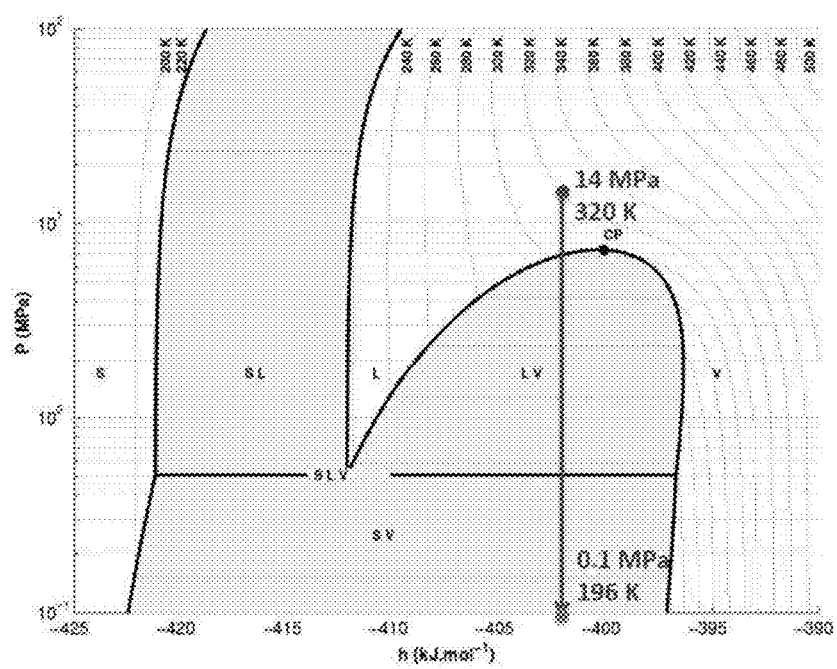

The valve 16 is then opened in order to enable the mixture to exit the autoclave 1 in the direction of the spray nozzle 20. This has the effect of suddenly making the pressure in the autoclave drop. At the same time, the flow rate of the pump 10 is increased in order to compensate for the pressure drop in the autoclave 1. It is sought to maintain a substantially constant pressure within the autoclave 1 during the spraying of the mixture through the spray nozzle 20 in order to obtain a pressure drop at the nozzle that is sufficient to attain the expected effect. This pressure is around 14 MPa, or more generally between 10 and 20 MPa during the spraying. The spraying takes place at a speed of around 100 m/s for a duration of around 1 to 2 min. During the spraying, the pressure in the collection tank 6 is equal to the atmospheric pressure. Since this pressure is less than 0.5 MPa, which is the pressure of the triple point of carbon dioxide, dry ice appears during the spraying and the solid-vapour equilibrium temperature is then around −77° C. (FIG. 2). The bag 15, which has a cut-off threshold of 5 μm, rapidly fills with particles of crumb and of dry ice. The bag is then emptied to recover the crumb.

In the example described, the spray nozzle 20 is of SK-MFP and SK Series type from the company Spraying Systems Co® and has a nominal diameter (the internal diameter of the spray orifice is understood) of between 340 and 400 μm.

FIG. 2 illustrates the phase diagram of pure carbon dioxide in pressure-enthalpy coordinates. During expansion, the carbon dioxide undergoes a significant change. Upstream of the nozzle 20, the carbon dioxide is present as a supercritical fluid at a pressure of 14 MPa and a temperature of 320 K. The expansion is isenthalpic, since neither useful power nor heat gain with the surroundings is provided. Thus, this expansion is marked for the carbon dioxide by a vertical line in the diagram. The outlet pressure is 0.1 MPa. It is observed that, starting from this point, there is generation of dry ice and the outlet temperature drops to 196 K.

In one variant, the expansion can be carried out at a higher temperature in order to avoid the formation of dry ice. Thus, upstream of the nozzle 20, the pressure of the carbon dioxide is set at 14 MPa and its temperature at around 355 K in order to then obtain, at the outlet, a temperature of around 200 K.

Figure 3:
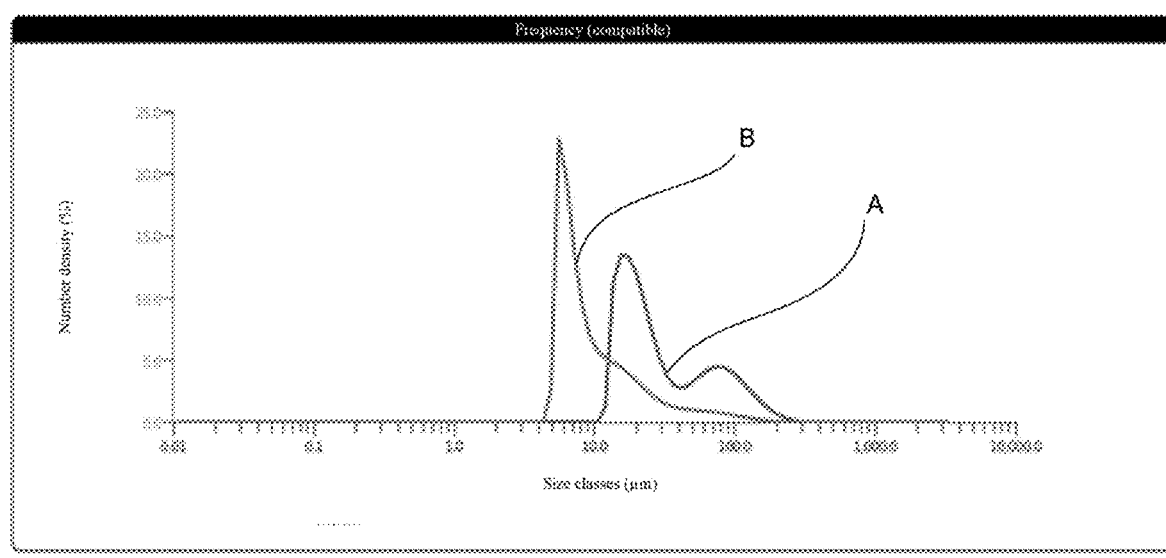

The graph from FIG. 3 illustrates the number distribution of the size (by size, the equivalent sphere diameter of a particle is understood) of the particles obtained with the process of the invention. Curve A illustrates a number distribution of the particles for which the median D50 is 24 μm and curve B illustrates the same distribution for D50 equal to around 8 μm. The other values of the distribution are visible in the table below:

|  | Registration number | Sample name | Dx (10) (μM) | Dx (50) (μM) | Dx (90) (μM) | D [4, 3] (μM) | D [3, 2] (μM) | Span (width of distribution) |
| --- | --- | --- | --- | --- | --- | --- | --- | --- |
| Mean | 81 | A | 14.4 | 23.7 | 102 | 154 | 122 | 3.680 |
| 1 × Standard deviation | 85 | B | 5.51 | 7.70 | 27.5 | 142 | 96.6 | 2.852 |
|  |  |  | 9.95 | 15.7 | 64.5 | 148 | 109 | 3.266 |
| 1 × RSD |  |  | 6.27 | 11.3 | 52.3 | 8.92 | 18.0 | 0.585 |
|  |  |  | 63.1 | 72.0 | 81.2 | 6.02 | 16.5 | 17.919 |

The process has made it possible to move from a distribution illustrated by the curve A to that of the curve B. The size is expressed here in terms of median diameter or median D50 which represents the diameter for which 50% by number of the particles of the powder have a diameter greater (or in an equivalent manner, less) than this value.

The particle size study demonstrates that the process of the invention surprisingly led to a significant reduction in the size of the particles: the particle size distribution expressed by number reveals a net shift of the main peak towards fine particles (the median diameter expressed by number changes from 24.1 on curve A to 7.7 µm on curve B). The images taken using an SEM electron microscope confirm that the size of the particles is one and a half to two times smaller after the treatment thereof with the process of the invention.

The decrease in the size the particles is mainly due to the mechanical stresses that they are subjected to when passing through the nozzle. The rapid passage through a calibrated orifice gives rise to a stretching of the rubber particle that is below the glass transition temperature of the rubber and breaks easily. Furthermore, the strong cooling generated by the sudden drop in the temperature on passing through the nozzle is likely to favour cryomilling by impacts between the particles. The combined effect of these two phenomena means that the size of the particles of rubber crumb collected in the bag 15 is significantly reduced relative to the initial size of the rubber granules. Moreover, the carbon dioxide acted as a solvent for the organic substances that surrounded the rubber granules during step b) of contacting and stirring the mixture. Therefore, the crumb obtained is free of any organic matter at the surface and is a dry crumb. The crumb particles thus obtained do not form agglomerates and the crumb mixes easily with the elastomer composition of a new tyre.

In one exemplary embodiment of the invention, use was made of an amount of 100 g of rubber crumb, the granules introduced into the autoclave 1 had a size of approximately D50 of 24 µm. Supercritical carbon dioxide was added to obtain a mixture having 20% to 30% by volume of powder. The mixture was stirred for a duration of 10 min at a speed of 500 rpm, at a pressure of 21 MPa and at a temperature of 50° C. Next, the valve 16 was opened and the mixture was sprayed through a nozzle 20, which is an SK-MFP nozzle from the company Spraying Systems Co®, of which the diameter of the spray orifice is 340 µm, the spray angle is 51°, and which is thermally insulated, into a container that is at atmospheric pressure. After 90 seconds of spraying, a dry crumb of rubber particles having a size for which the distribution is as described hereinabove with reference to FIG. 3 is obtained in the bag 15.

The size of the crumb particles depends on the pressure and on the temperature during the passage through the spray nozzle, and also on the diameter and on the shape of this nozzle.

Other variants of the invention may be envisaged without departing from the scope of these claims. Thus, it is possible to carry out a cascade micronization by making the crumbs pass through several nozzles successively, it being possible for the size of the spray orifice of the nozzles to be gradually reduced.

The invention claimed is:

1. A process for manufacturing rubber crumb comprising the steps:
   (a) suspending rubber granules having a given size in an autoclave containing a supercritical fluid to form a mixture;
   (b) agitating the mixture for a predetermined time at constant pressure and constant temperature; and
   (c) carrying out an isenthalpic expansion of the mixture from step (b) by spraying it through a nozzle, thus obtaining rubber crumb particles,
   wherein the temperature of the mixture decreases during step (c) to a temperature below the glass transition temperature of the rubber, and
   wherein a size of the rubber crumb particles is reduced relative to an initial size of the rubber granules.

2. The process according to claim 1 further comprising the step:
   (d) separating the rubber crumb particles from the supercritical fluid after step (c).

3. The process according to claim 1, wherein the rubber granules from step (a) have a size equal to or less than 2 mm.

4. The process according to claim 1, wherein the isenthalpic expansion takes place in a collection container that is at atmospheric pressure.

5. The process according to claim 1, wherein step (c) takes place in a collection container equipped with a filter bag.

6. The process according to claim 1, wherein the rubber granules are mixed with the supercritical fluid to give a mixture having a crumb content ranging up to 50% by volume.

7. The process according to claim 1, wherein the supercritical fluid is carbon dioxide.

8. The process according to claim 7, wherein, during step (b), the pressure is between 10 MPa and 30 MPa and above the critical pressure of the supercritical fluid.

9. The process according to claim 7, wherein, during step (c), the pressure in the autoclave is maintained at a value of between 10 and 20 MPa.

10. The process according to claim 2, wherein the supercritical fluid from step (d) is reused for manufacturing the rubber crumb.

11. The process according to claim 1, wherein the crumb obtained in step (c) is used as the rubber granules in step (a).

12. A process for manufacturing a rubber composition for a tire comprising the steps of:
   manufacturing rubber crumb particles using the process according to claim 1; and then using the rubber crumb particles in the rubber composition.

13. The process according to claim 12, wherein the rubber crumb particles have a dimension of less than 30 µm.

14. A process for manufacturing a tire comprising the steps of:
   manufacturing a rubber composition according to the process of claim 12; and
   using the rubber composition to manufacture a tire.

15. The process according to claim 1, wherein the nozzle has a spray orifice having an internal diameter of between 340 and 400 µm.

16. The process according to claim 15, wherein the rubber granules have a mean diameter equal to or less than 200 µm.

17. The process according to claim 1, wherein the rubber crumb obtained in step (c) is dry.

* * * * *